United States Patent [19]

Jepson

[11] Patent Number: 5,043,906
[45] Date of Patent: Aug. 27, 1991

[54] ABSOLUTE GOUGE AVOIDANCE FOR COMPUTER-AIDED CONTROL OF CUTTER PATHS

[75] Inventor: Carl T. Jepson, Northville, Mich.

[73] Assignee: Ford Motor Company, Dearborn, Mich.

[21] Appl. No.: 441,018

[22] Filed: Nov. 24, 1989

[51] Int. Cl.⁵ .................... G06F 15/60; G06F 15/70
[52] U.S. Cl. .................... 364/474.34; 364/474.2; 364/474.24
[58] Field of Search .......... 364/474.2, 474.24, 474.34, 364/521, 518, 191, 474.28

[56] References Cited

U.S. PATENT DOCUMENTS

| | | | |
|---|---|---|---|
| 4,513,366 | 4/1985 | Munekata et al. | 364/167.01 |
| 4,558,977 | 12/1985 | Inoue et al. | 409/80 |
| 4,618,924 | 10/1986 | Hinds | 364/191 |
| 4,789,931 | 12/1988 | Kuragano et al. | 364/474.18 |
| 4,907,164 | 3/1990 | Guyder | 364/474.15 |

OTHER PUBLICATIONS

"Geometric Simulation of Numerical Control Machining", Jerard et al, ASME International Conf. on Computers in Engineering, Aug. 1-3, 1988.
"Simulation of Numerical Control Machining of Sculptured Surfaces", Jerard et al, International Symposium on Automotive Technology and Automation, Flims, Switzerland, Oct. 1986.
"Development of an NC Machining System for Stamping Dies by Offset Surface Method", Sakuta et al, Conference Proceedings, Nov. 1987.
"Dev. of Complex Free Surface NC Milling Sys. for Stamping Dies", Ikeda et al, Toyota Eng., vol. 38, No. 1, 1988, pp. 64-75.

*Primary Examiner*—Jerry Smith
*Assistant Examiner*—Paul Gordon
*Attorney, Agent, or Firm*—Joseph W. Malleck; Roger L. May

[57] ABSTRACT

A method of eliminating surface gouging in computer-aided control of cutter paths, comprising the steps of: (a) generating three-dimensional computer images of a surface to be emulated and of a revolving cutter head; (b) imposing an x-y coordinate grid work onto each image and assigning a z coordinate to the cutter depth and surface height for each grid; (c) while digitally moving the cutter head over the emulated surface, determining the highest sum of z coordinates for each grid within the superimposed area; and (d) using such highest sum as the lowest z coordinate for a cutter reference point at each such digital position of the cutter, the highest sum being adjusted for any difference between the reference point and cutter depth at such highest sum grid.

15 Claims, 9 Drawing Sheets 3a   3b   3c   3d 3e   3f   3g

ABSOLUTE GOUGE AVOIDANCE FOR COMPUTER-AIDED CONTROL OF CUTTER PATHS

BACKGROUND OF THE INVENTION

1. Technical Field

This invention relates to the technology of computer-generated numerical control (NC) of cutter tool paths for complex surfaces, and particularly to gouge avoidance systems that attempt to eliminate intersurface and intrasurface interference.

2. Discussion of the Prior Art

NC tool programs produced by CAD/CAM systems almost never cut parts right the first time. The NC tool program must usually run several test parts for debugging and modification before letting the program cut metal. This debugging is acceptable for industries which use NC programs to make production parts. It is uneconomic for companies trying to use NC to make molds or dies which are usually produced in lots of one, or at most two or three.

NC tool path programs using CAD/CAM systems do not produce correct tool paths because the print of the revolving cutter head is never the same shape as the surface to be duplicated or created in complex molds or dies. The print of the revolving cutter head must be moved along to remove metal leaving only the surface to be duplicated or created as the ideal result. Such result is never physically attainable, but can be approached with a higher degree of success than that now possible by prior art techniques. Deficiencies of the prior art can be attributed to either the NC tool program being too elementary and thus inaccurately rough in the guidance of the cutter head, or the program is extremely complex based upon sophisticated mathematical algorithms which estimate numbers with floating point coefficients and thus eventually produce errors.

The tool path generation program behaves, in the case of the elementary method, as if it were a blind caterpillar inching its way over each segmental surface of the part. The surface is represented usually as coordiantes of a mesh of a limited number of points in space. But consider that die cavities for automotive panels consist of several, many times more than 200, segmental surfaces. Like the blind caterpillar, the CAD/CAM system generating a tool path on one surface is unaware that the other segmental surfaces exist. When the tool reaches the edge of one surface, the path generation program is not smart enough to stop the tool's motion before it gouges the adjacent surface. Simplistic tool path generators do not have the ability to "look ahead" to see adjacent surfaces approaching. They know the diameter of the revolving cutter head but do not stop the tool before it collides with the adjacent surface.

The more complex program may consist of mathematical equations of a surface in space by analytical geometry. This method requires a minimum of input data, but the entire surface is dependent upon the accuracy of the analytical mathematical equations. These equations should simulate the real surfaces of interest and at the same time be manageable. This demands compromises between versatility and complexity. Estimations through floating point coefficients are involved in such techniques and are quite evident when reading examples of this state of the art (see U.S. Pat. No. 4,558,977; "Geometric Simulation of Numerical Control Machining", R. B. Jerard et al, ASME International Conference on Computers In Engineering, Aug. 1-3, 1988; "Simulation of Numerical Control Machining of Sculptured Surfaces", R. B. Jerard et al, International Symposium on Automotive Technology and Automation, Flims, Switzerland, October 1986). It is the floating point estimation and complex equations that prevents the equations from attaining absolute objective accuracy.

The prior art has attempted to solve gouge avoidance by essentially two techniques: (a) manual interference checking which is tedious, time-comsuming, and prone to costly errors; or (b) use of additional algorithms which attempt to compute intersections using floating point computations between the cutter and the surface (see U.S. Pat. No. 4,789,931; and "Development of an NC Machining System for Stamping Dies by Offset Surface Method", Sakuta et al, Conference Proceedings, November 1987"; and "Development of Complex Free Surface NC Milling System for Stamping Dies", Ikeda et al, Toyota Engineering, Vol. 38, No. 1, 1988, pp. 64-75). In these latter references, the revolving cutter has one mathematical model and the surface to be emulated another. The added intersection algorithms are additionally complex, time-consuming, and, most importantly, lead to roundoff and tolerance errors which cannot be avoided. None of these techniques provide for absolute assurance for avoiding gouge interference.

It is therefore an object of this invention to provide a method of generating NC cutter paths which provide for absolute intersurface and intrasurface interference protection for an unlimited number of segmental surfaces with any shape of cutter. With such absolute assurance, a physical or test piece no longer has to be made; the cost and time required for generating NC surfaces is reduced, and the accuracy, quality, and repeatability of cuts is improved. This system will not require a user to identify certain surfaces as drive or check surfaces, a labor intensive and error prone process.

SUMMARY OF THE INVENTION

The invention is a method of eliminating surface gouging in computer-aided control of cutter paths. The method comprises essentially four steps: (a) generating three-dimensional computer images of a surface to be emulated and of a revolving cutter; (b) imposing an x-y coordinate grid work onto each image and assigning a z coordinate to the cutter depth and surface height for each grid; (c) while digitally moving the cutter over the surface, determining the highest sum of z coordinates for each grid within the superimposed area; and (d) using such highest sum as the lowest z coordinate for a cutter reference point at each such digital position of the cutter, the highest sum being adjusted for any difference between the reference point and cutter depth at such highest sum grid.

Preferably, the three-dimensional computer images are generated by a computer CAD/CAM system utilizing satisfactory general surface equations.

The digital movement of the cutter may be along a single direction, comparable to a cross-section of the surface to be emulated, or may be a compound movement such as experienced when castle cutting or pencil tracing. Thus, any combination of digital x-y moves may be utilized.

Imposing an x-y coordinate grid work onto the images essentially comprises imposing a two-dimensional grid network over the area to be modeled, each network being comprised of a series of uniform-sized pixels which may be selected to have varying side dimension depending upon the efficiency and size of the computer used in the design as well as the size of the surface or cutter head being imaged. Such pixel size may range from 0.005-0.03 inch for exemplification. Preferably, the grid size for emulated surface and cutter images is about 0.01 inch.

Although there is no limit to the character of the emulated surface that can be used, if such emulated surface has undercut segments, there must be assigned more than one z coordinate to accommodate such undercut areas and the movement of the cutter head must be along a more compound curvature enabling the cutter head to reach into such undercut areas, thus demanding greater than three axis control of the cutter head movement.

Preferably, the process may additionally comprise the step of using thinning algorithms to eliminate unnecessary intermediate points in the accumulated string of reference points for controlling the cutter head movement.

Additionally, the process may comprise the step of modeling a free-form line onto the computer image of the emulated surface to serve as an artificial no-cut window further controlling the limits of the cutting path.

The advantages that result from the use of such process include (a) the use of an unusually simple method which is extremely reliable and very practical; (b) the interference protection is absolute; (c) the need for a physical model prior to cutting stock is totally eliminated; (d) the cost and time required to provide numerical controlled cut surfaces is greatly reduced; and (e) the accuracy, quality and repeatability of NC machining is highly enhanced.

DETAILED DESCRIPTION AND BEST MODE

Figure 1:
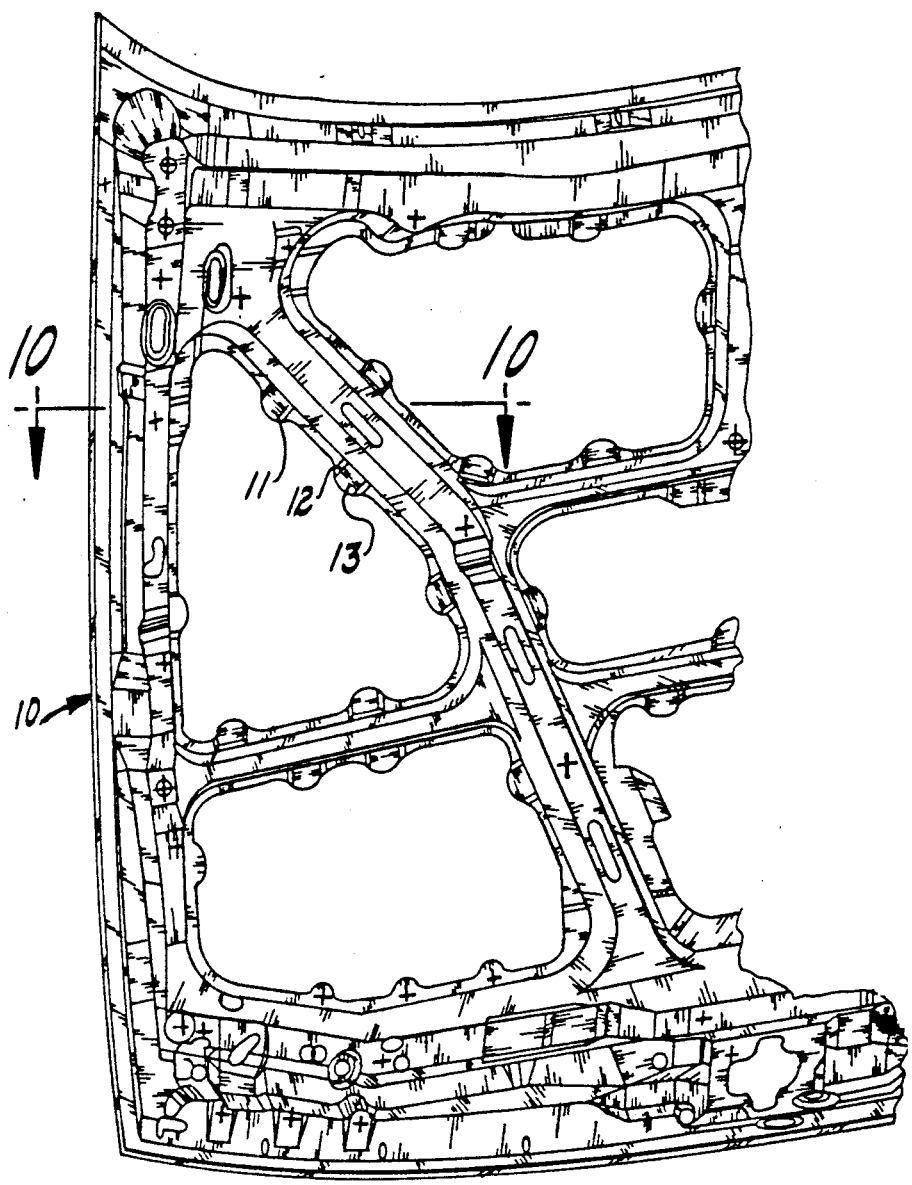
FIG. 1 is a schematic partial plan view of an inner body panel representing a part to be produced by the method of this invention, which part has an extremely large aggregation of varying segmental surfaces.
Figure 2:
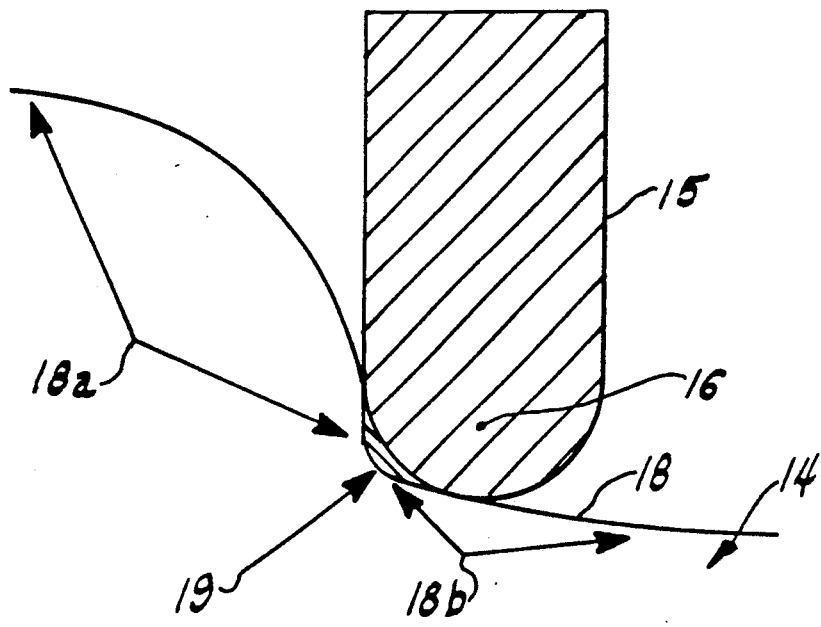
FIG. 2 is an elevational diagramatic view of a cutter attempting to machine away workpiece material at an abrupt change in contour.
Figure 3:
FIGS. 3a–3g are a series of elevational views of varying cutter head shapes that may be employed in computer-aided cutting of workpieces.
Figure 3:
Figure 3:
Figure 3:
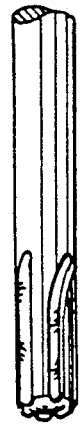
Figure 3:
Figure 3:
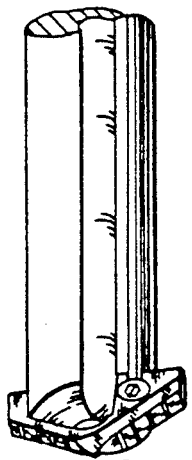
Figure 3:
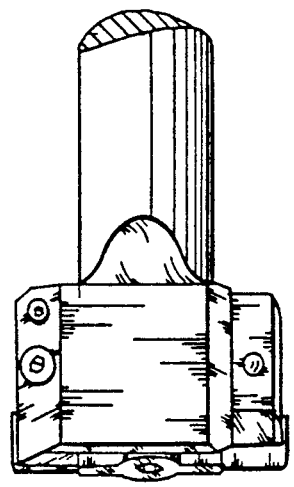

Reduction of lead time to make automotive stamping dies is strongly desired in the competitive environment of the automotive industry. What should be of paramount concern is the ability to cut such dies with NC in steel the first time with absolute accuracy, free of gouging or surface interference. The enormity of this problem is best exemplified with automotive inner body panels represented in FIG. 1. The body panel, such as for a hood inner panel 10, can have more than 1000 different segmental surfaces 11, 12, 13, etc., which is more than 30-40 times those of a hood outer panel of the same size. To machine a workpiece 14 to form a die for stamping sheet metal that will become such inner body panel 10, the revolving cutter head 15 (as shown in FIG. 2) must have its head center 16 or other reference point moved along in such a manner as to cut away as much of the unwanted stock of the workpiece as possible, leaving an emulated surface 18 made up of segments 18A and 18B and fillets 19 between such segments. It is difficult to determine the optimum cutter path which will cut as much of the surface shape as possible without allowing the cutter to violate or interfere with the surface being cut. The cutter cannot fit into all of the corners and depressions in the surface without the sides of the cutter gouging the surface. This is particularly evident when attempting to create a cutter path for a complex shape such as an automotive inner body panel which will often be defined as a network of many surface entities in a CAD/CAM system. The smaller the revolving envelope or print 15 of the cutter head, the closer one can get to the desired surface, but at the sacrifice of increased total machining time. Smaller revolving envelopes or prints means cutter heads having a diameter of 20 mm or less. Thus, it is often necessary to rough NC machine with a larger cutter head shape (such as shown in FIGS. 3B, 3F–3G) to reduce the time for removal of a substantial amount of metal, followed by repeat NC machining using smaller cutter head shapes (such as shown in FIG. 3E) to approach the desired surface as close as possible.

In the past, tedious manual checking of the center of the cutter envelope at plural surfaces was necessary to avoid gougings. Not only did this require exorbitant man hours, it allowed unnecessary errors to creep into the final control path. Others have used complex high order equations to predict and control the cutter path to avoid interference without absolute assurance of avoidance. This is the area of improvement of this invention—to avoid complex surface algorithms which estimate the likelihood of interference. This invention substitutes a postive simple-addition method that achieves absolute control results. This does not mean that the total NC machining control will not need algorithms, such will still continue to be required not for interference avoidance but for areas such as is necessary to represent any point on a surface segment by its boundaries and blending functions and to provide special forming considerations in metals as over-crown or over-bend.

Figure 4:
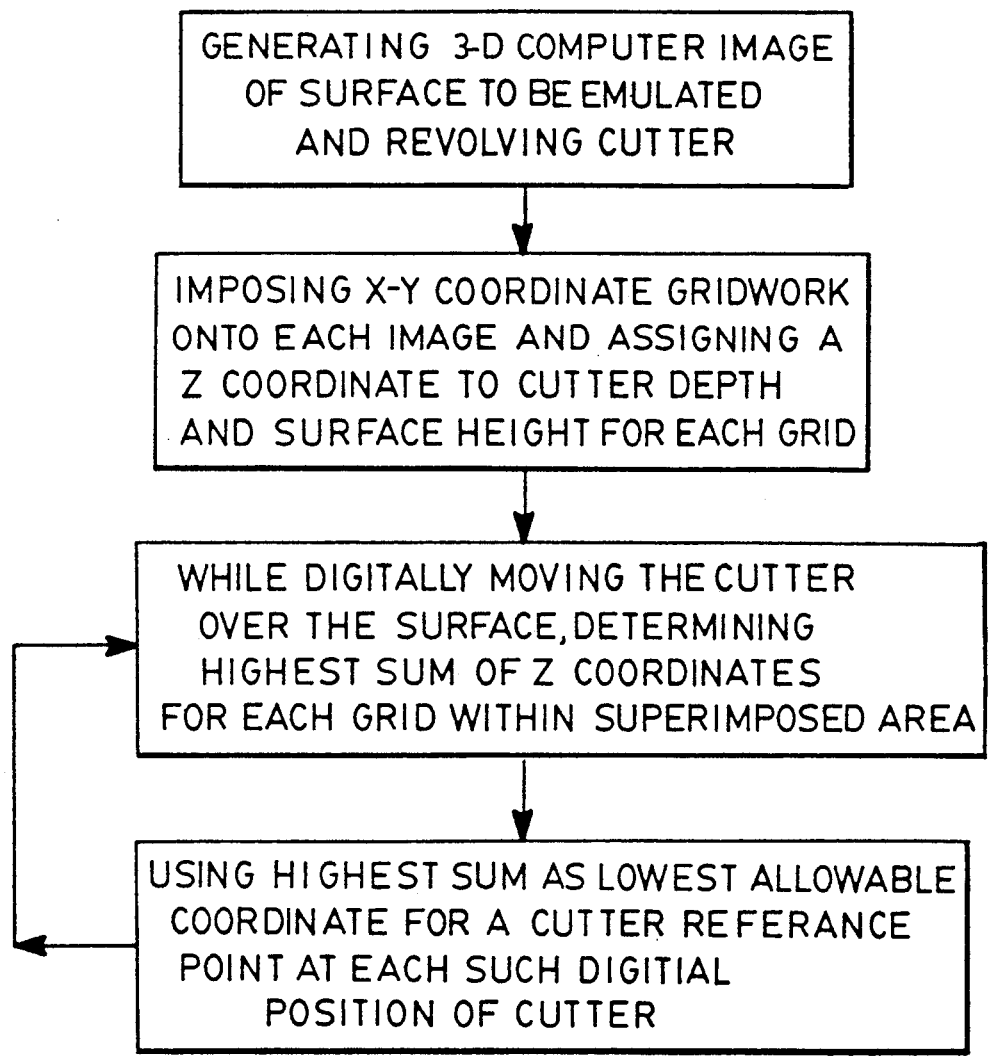
FIG. 4 is a flow diagram of the steps of the process of this invention.

The method of this invention is broadly set forth in its essential aspects in the flow diagram of FIG. 4.

Generating Computer Images

Computer images, for purposes of this invention, may be represented by coordinates of a mesh or points in space. By this method, surfaces of any complexity can be represented and any desired accuracy can be obtained by using sufficient density of points. It has the disadvantage that the surface is defined only at the input points and an immense amount of data is required for accurate representation of the complex surfaces. Preferably, the surface is represented by mathematical equations of a surface in space as in analytic geometry. This method requires a minimum of input data and the entire surface is defined continuously and analytically. However, the accuracy of surface representation is even more dependent on the type of equations employed. Complex surfaces are divided into four-sided surface elements called "patches". Each patch is then defined by a general equation using functions as independent variables. The form of these functions is then chosen to provide the quality of definition that is desired.

Figure 5:
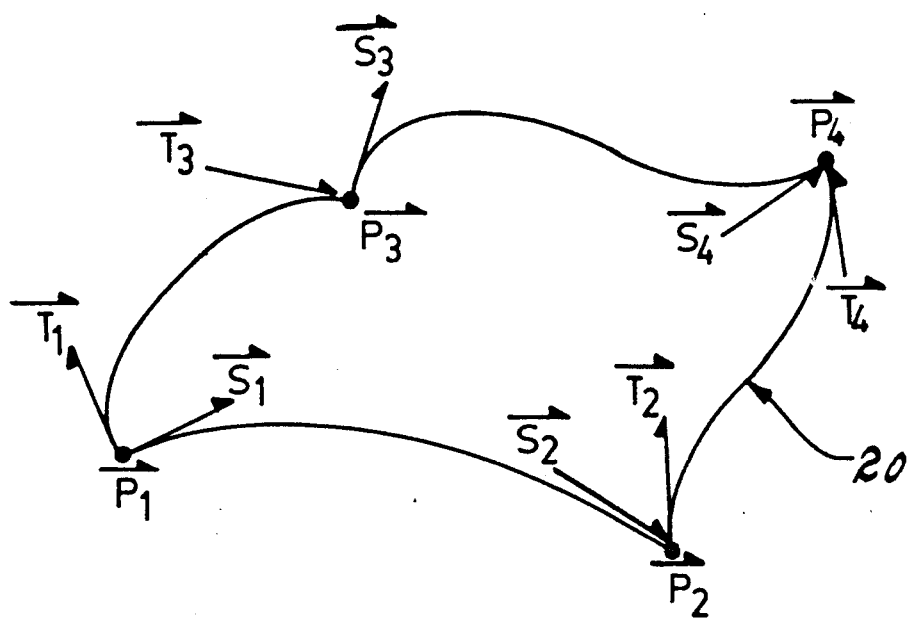
FIG. 5 is an illustration of an analytic patch used in representing surface segments.

For the purpose of the preferred mode, cubic polynomials can be used as independent variables. This choice provides enough versatility to allow assurance of slope continuity across patch boundaries without unduly complicating the mathematics. With this choice of functions, each patch 20, as shown in FIG. 5, is completely characterized by specification of nine parameters at each corner. These corner parameters consist of: (a) three space coordinates S of the corner point itself; (b) three components of a vector P (called a "tangent vector") whose direction is that of one of the boundary curves at the corner and whose magnitude controls the curvature of that boundary curve; and (c) three components of the tangent vector T of the other boundary curve at the point. Thirty-six parameters are required to define each patch. This provides the user with considerable control over the shape of the patch. The parameters at a given patch corner influence only those boundaries intersecting at that corner. This simplifies the input data requirements and simplifies the task of modifying surfaces composed of the number of patches. Continuity of the surface at the boundary of adjacent patches is assured by specifying the same coordinates for the common corner points and the same tangent vectors along the common boundary. Continuity of slope can be provided by specifying equal tangent vectors across the boundary at the common corner points.

After the patches are combined to form a surface, any given segment of the surface can then be modified or constrained from being modified, depending on the parameters which are varied. This means that a single patch or a small group of patches can be shaped in detail and then combined to form the desired complex surfaces.

Figure 6A:
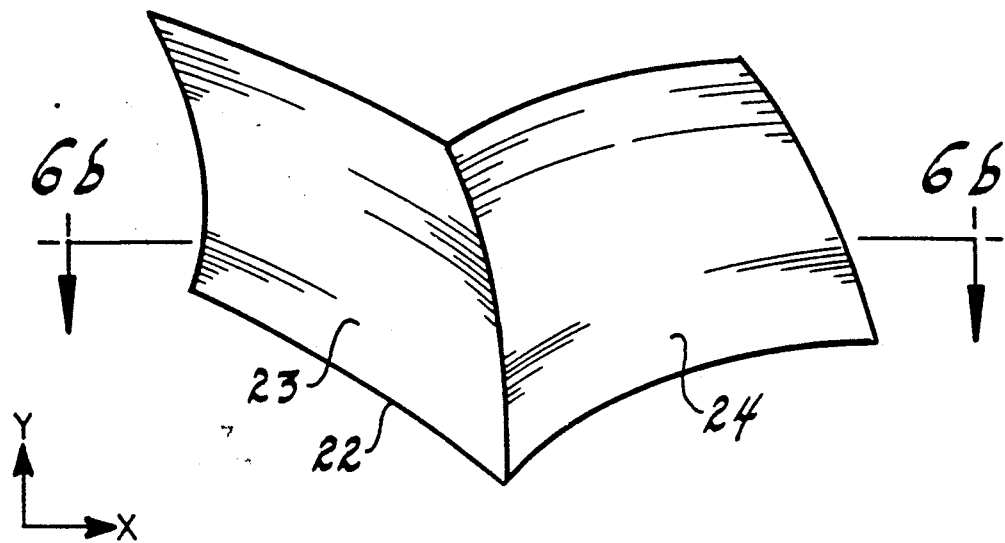
FIGS. 6A and 6B represent respectively plan and elevational views of a hypothetical simple surface segment emulated for NC cutting.
Figure 6B:
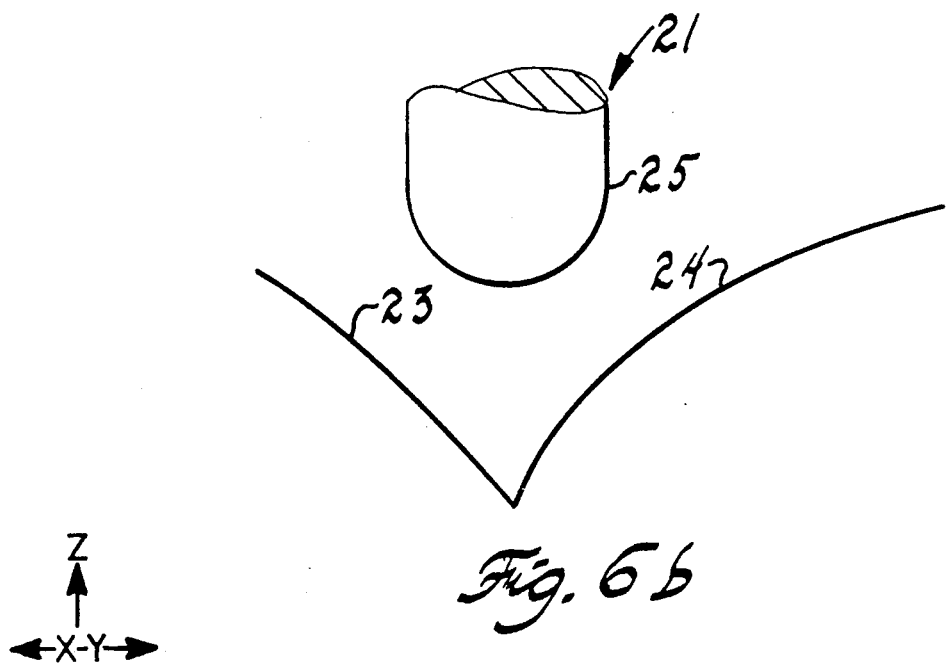

For purposes of illustrating the gouge avoidance technique of this invention, the computer image of an emulated surface 22 may be comprised of two converging patches 23, 24, here representing two segmental surfaces of an inner body panel; they are shown in plan and elevational views in FIGS. 6A and 6B respectively. Similarly, a computer image 21 of a hemispherical surface 25, being the lower extremity of a revolving cutter head, is also shown in elevational view in FIG. 6B.

Imposing and Assigning Coordinates

Figure 7A:
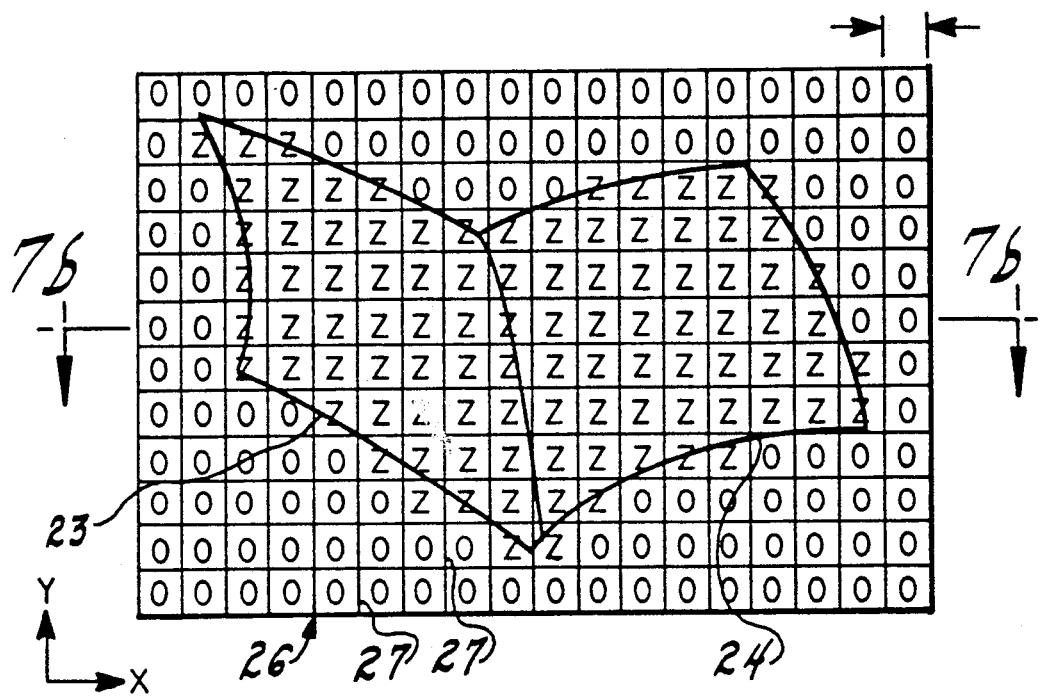
FIG. 7A is a plan view of the surface segments of FIG. 5 to which have been imposed x-y coordinate grid work, and to which has been assigned a z coordinate.
Figure 7B:
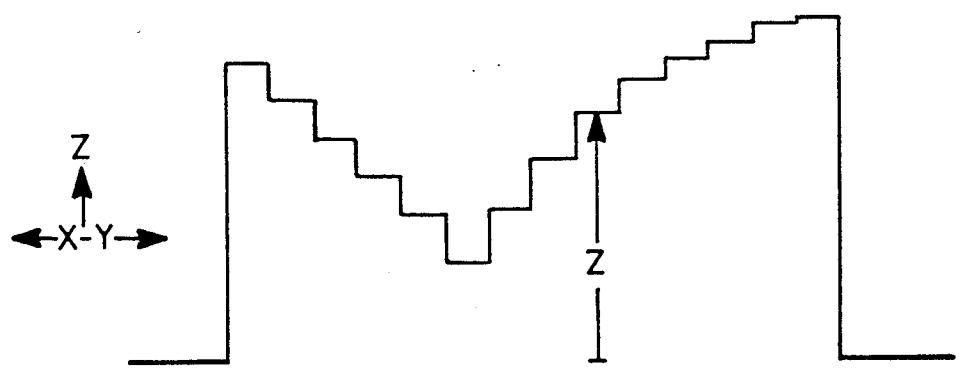
FIG. 7B is an elevational view of the same surface segments as in FIG. 7A illustrating more clearly the height of the z coordinates for the segmental surfaces.

Within and by use of a computer, an x-y coordinate grid work 26 is imposed onto each of the computer images 21 and 22. In FIGS. 7A and 7B, a two-dimensional x-y grid work 26 is placed over the plan view area to be modeled. Each unit 27 of the grid (square pixels) is selected to be sufficiently small to provide a desired accuracy for the type of machining operation (i.e., rough or finish) and for the suitability of the surface complexity. The pixel size is variable. The smaller the pixel size, the more accurately the image and grid work will approximate the original surface definition. There is no critical minimum or maximum size. However, for a rough casting pattern, a pixel having a side dimension of 0.1 inch may be satisfactory. With standard finish hard dies, a pixel dimension of about 0.01 inch (25 mm) may be utilized. Pixel dimensions smaller than 0.005 inch (100 mm) may be utilized, but will require and demand an increased capacity in a computer main frame due to demand placed on the computer memory to handle the data operations within a reasonable amount of time.

Within each pixel, a z coordinate (perpendicular to the x-y plane) is assigned. All pixels within the superimposed computer image of an emulated surface or cutter head contribute to assigning z values in the combined model. Areas where there are no computer image surfaces will have a z depth of zero and represent no surface to be cut. The combined grid network and computer image is referred hereinafter as the "grid image". Z values may be stored to any accuracy and are not limited to the grid element tolerance. The z values could be stored in any convenient computer format such as integer or floating point format. The integer format is typically 2 or 4 bytes of computer memory. The floating point format is typically 4 bytes of computer memory composed of a mantissa and an exponent.

Figure 7C:
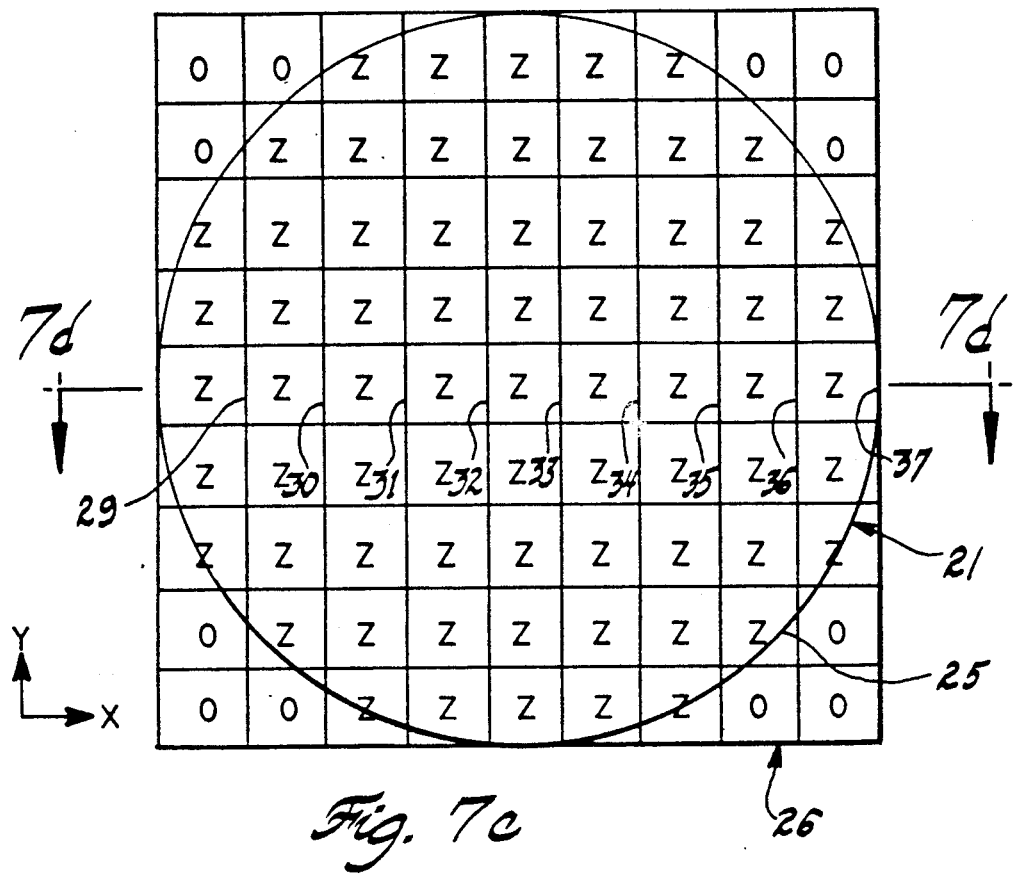
FIG. 7C is a plan view similar to 7A but for the cutter head having the x-y coordinates imposed thereover with z coordinates assigned to each pixel.
Figure 7D:
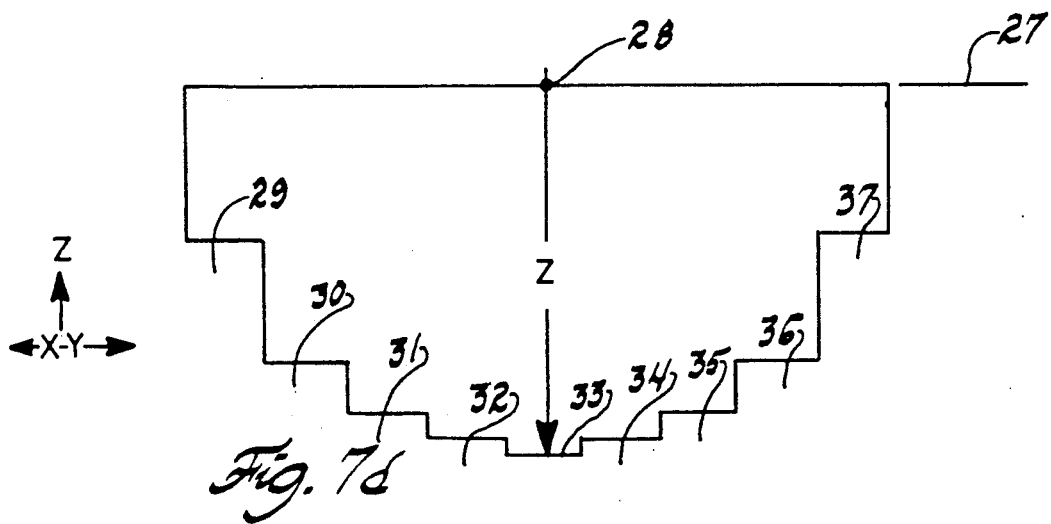
FIG. 7D is a view similar to 7B but for a cutter head showing the z coordinate depth for each pixel area of the cutter head.

As shown in FIGS. 7C and 7D, the revolving cutter head print or shape 25 has the same two-dimensional x-y grid work 26 superimposed thereover. Z values are again assigned within the grid work corresponding to the z depth of the cutter within each pixel of the computer image of the emulated surface 25. The grid image of the cutter head is a two-dimensional array of z depths, the z depth being measured from a plane 27 parallel to the x-y plane of the emulated surface grid work, such plane passing preferably through the center 28 of the cutter head revolving shape or can be some other convenient reference point. The pixel size for the cutter head can be smaller than the pixel size for the emulated surface because the cutter array is typically smaller. The cutter holder and shank can also be included within the grid image of the cutter head shape.

Digital Movement of the Cutter Head

The computer image 21 of the revolving cutter head is incrementally moved over the computer image 27 of the emulated surface along a path 30 or a series of paths. Incremental movement means to digitally shift or advance the center or reference point 28 of the revolving cutter head shape from pixel 29 to the next adjacent pixel 30 and to the next adjacent pixel 31, and so on, of the emulated surface. The path may be a straight line along an x section or along a y section, or may be along a series of pixel spaced x or y sections, or may be a curved or spiral line. However, such movement must be from one grid to the next within the x-y plane.

Figure 8A:
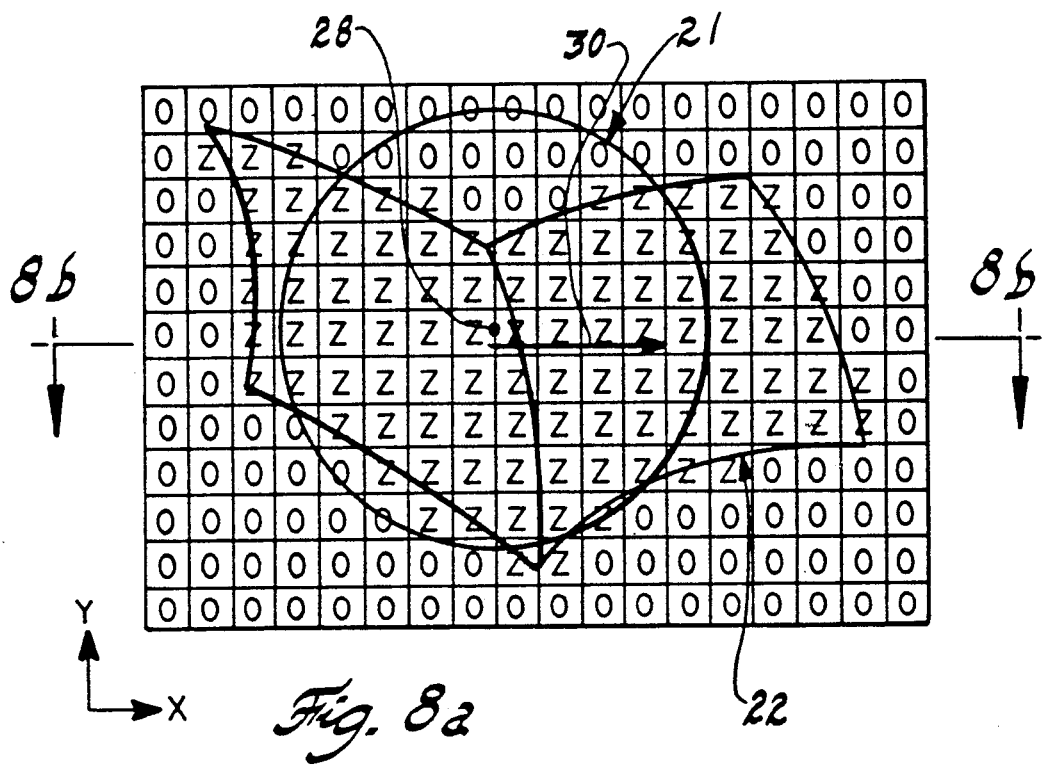
FIG. 8A is a schematic illustration of how the z coordinates of the superimposed cutter head over the segmental surfaces are to be added for each superimposed pixel area.
Figure 8B:
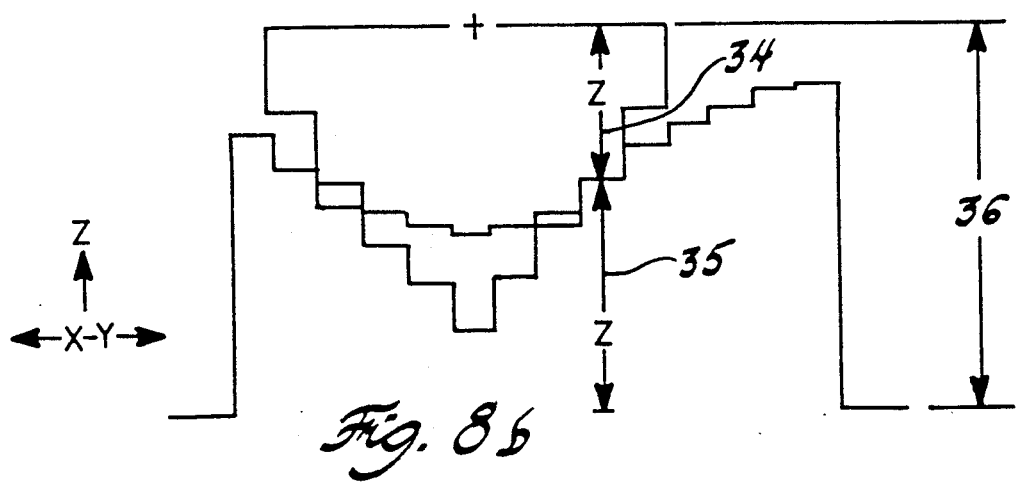
FIG. 8B is an elevational view of the illustration of 8A showing how the highest sum of z coordinates for both the cutter head and emulated surface become the contact point between the cutter head and segmental surfaces for any digitized position of the cutter head.

At each digital station of the cutter head center or reference point 28, the sum of each pair of aligned or superimposed z coordinates 34, 35, for the revolving cutter head and emulated surface respectively (resulting in sum 36) is made. This involves making about 69 additions for the example shown in FIGS. 8A and 8B which is equivalent to the number of pixels of the revolving cutter head.

Selecting the Z Coordinate for Control

Figure 8C:
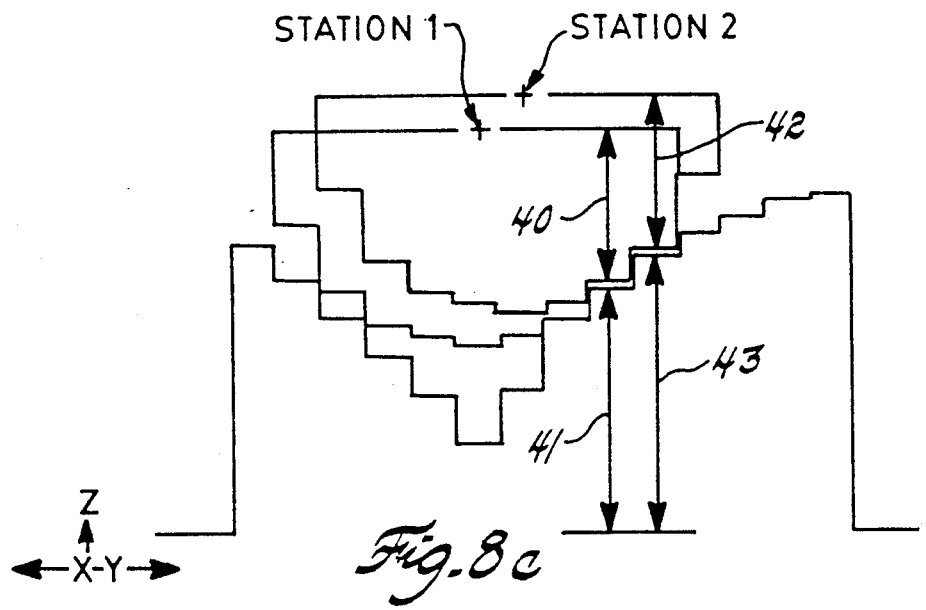
FIG. 8C is a view similar to FIG. 8B showing how the cutter head makes one digital move to develop a new control reference point, the cutter head is shown in two different positions with the highest z sum dictating the contact point.

The correct z depth at each revolving cutter head station is determined by simply adding every revolving cutter head pixel z depth aligned with a pixel directly below of the emulated surface. The z depth coordinate of the pixel for the revolving cutter head print image which produces the highest sum is the controlling z depth coordinate for the cutter head center or reference point at the digital station associated with making of such sum. The pair of aligned pixels that produces the highest sum will represent the contact point of the revolving cutter head element with the emulated surface at that station of the cutter head center. Controlling the coordinates of the cutter head means that the ultimate lowest z depth coordinate that the center or reference point of the cutter will be allowed to go or cut at the associated station, compensated for any plus or minus difference in the magnitude of z depth coordinates for the reference point of the cutter head with the z coordinate for the pixel that enters into the highest sum. As shown in FIG. 8C, the highest sum for the cutter head having the reference point 28 at station #1 will be made up of z depth 40 and z height 41. At station #2, the largest sum is made of z depth 42 and z height 43.

Figure 9:
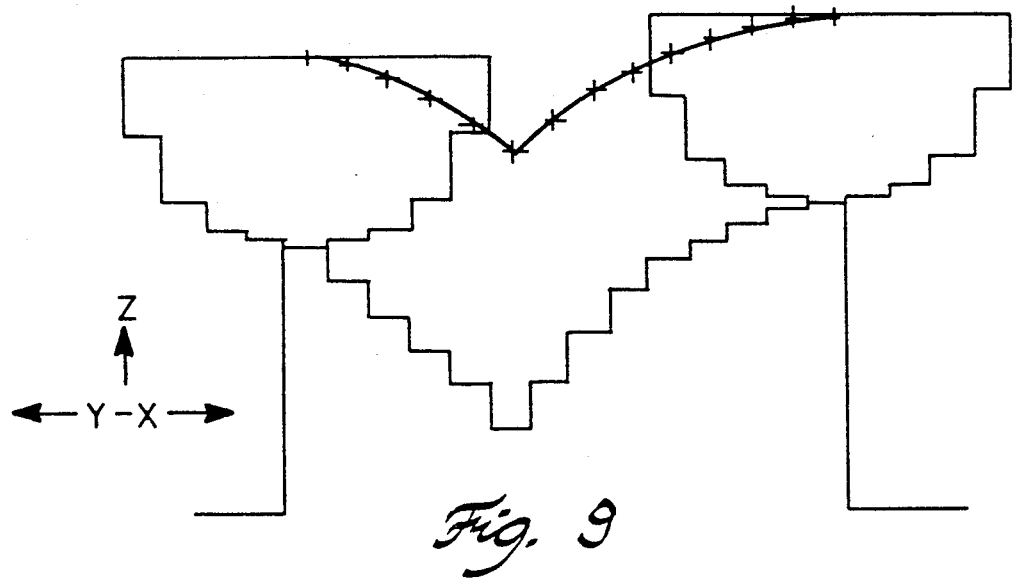
FIG. 9 is an elevational view of how the cutter head is digitally moved along a cross-section of the emulated surface to develop a series of control reference points for guiding the cutter head, each control point being developed by the summation of z coordinates at each digitized position.
Figure 10:
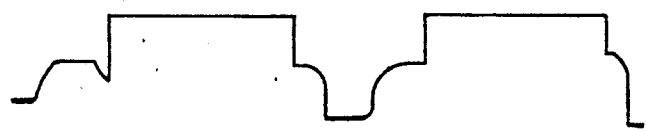
FIG. 10 is a simplified representation of part of a computer image of the cutter path developed along one section 10—10 of the part in FIG. 1 in accordance with the method of this invention.

The complete three-dimensional digital cutter path is the string of centers or reference points derived as the controlling points from all of such summations and selection, such string of points being composed of the x-y coordinates and the highest z sum for that position. For simplicity, FIG. 9 shows only one partial string of cutter points for cutting an inner body panel, which path eliminates gouging or interference. The making of such summations, although providing for absolute accuracy, requires large capacity computers to reduce the summation time to very short periods.

Interference detection takes two forms: intersurface interference, occurring when the cutter inadvertently collides with a surface adjacent to the one being cut; and intrasurface interference occurring within the surface being cut when the cutter encounters an area with a radius of curvature smaller than that of the cutter itself, resulting in undercutting of the surface. Intrasurface interference also occurs during lead-edge cutting with the flat end tool when the back edge inadvertently digs into an adjacent area. This invention detects both forms of interference.

The resultant cutter path can be further processed to thin out unnecessary points using any of the traditional three-dimensional point thinning algorithms. As an example, a string of points may be eliminated until the chord height error between the thinned string and the original string of points exceeds a specified error tolerance.

The generation of the cutting path is not necessarily limited to straight sections cutting along the x or y axis. The cutter head can be moved in any combination of x-y moves to simulate cutting at angles to the x-y axis or to simulate any of the traditional curved NC three-dimensional cutting methods such as castle cutting, spiral cutting or tracing, etc. In addition, free-form lines may be modeled on the same two-dimensional grid work to serve as "cut windows" or "no cut windows" to further control the limits of a cut path in cases where it is undesirable to cut all of the model. The cutter may be made to stop or start when the center of the cutter crosses the same two-dimensional grid element that a line passes through. Also, by using the contact point information obtained by projecting the revolving cutter head print onto the model, the cutter head may be controlled by the contact point instead of the center of the cutter head as the reference point.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed:

1. A method of eliminating surface gouging in computer-aided control of cutter paths, comprising:
   (a) generating three-dimensional computer images of a surface to be emulated and of a revolving cutter head;
   (b) imposing x-y coordinate grid work onto each image and assigning a z coordinate to the cutter depth and surface height for each pixel of the grid;
   (c) while digitally moving the cutter head over the emulated surface, determining the highest sum among each addition of z coordinates for a cutter depth pixel and the z coordinate for the surface height pixel aligned with such cutter depth pixel resulting from the superimposition of step (b); and
   (d) using the z coordinate for the cutter head that achieves the highest sum at each such digital position, said maximum z coordinates at each pixel acting as control points for the cutter path.

2. The method as in claim 1, in which the three-dimensional computer image is generated by use of general surface equations.

3. The method as in claim 1, in which the grids within such grid work have a side dimension in the range of 0.005-0.1 inches.

4. The method as in claim 1, in which step (b) of imposing is carried out by sampling the surface with sufficient density to define each grid pixel.

5. The method as in claim 1, in which step (c) of digital movement is along a straight line path or series of straight line paths for an x or y section of the x-y plane.

6. The method as in claim 1, in which in step (c) digital movement is carried out along a curved line path or series of curved line paths or spirals in the x-y-z coordinate system.

7. The method as in claim 1, in which digital movement means is carried out by shifting the center of the revolving cutter head or reference point thereof from one pixel to the next selected pixel.

8. The method as in claim 1, in which the selected lowest z coordinate for the cutter reference point at a digital position is the tangential contact point between the revolving cutter head and the emulated surface.

9. The method as in claim 1, in which steps (c) and (d) are carried out within a time period of one second.

10. The method as in claim 1, in which said method is used to cut a workpiece, followed by polishing the workpiece cut by the computer-aided control of the revolving cutter head to remove any microfillets remaining after accomplishing the cutting operation.

11. The method as in claim 1, in which the resultant cutter path is further processed to thin out unnecessary control points using a three-dimensional point thinning algorithm.

12. The method as in claim 11, in which the thinning algorithm is based on chord height error limits.

13. The method as in claim 1, in which free-form cut windows or no-cut windows are computer modeled onto the three-dimensional cutter head and emulated surface images to control the limits of the cut path.

14. The method as in claim 1, in which the control points are stored in the format of either integer or floating point.

15. A method of eliminating surface gouging in computer-aided control of cutter paths, comprising:
  (a) generating three-dimensional computer images for each of a surface to be emulated and a revolving cutter head print;
  (b) imposing x-y coordinate grid work over each of the images, said grid work being subdivided into pixels;
  (c) assigning a value at each pixel of the grid works for a z coordinate corresponding to the height of the surface in the case of the surface image and to the depth of the cutter head print image from a plane parallel to the x-y plane and passing through a reference point on the cutter head, the z coordinate extending perpendicular to the x-y coordinate plane at each pixel;
  (d) at each desired incremental movement of the cutter head reference point and with the cutter head print image superimposed over the surface image, adding every z coordinate of the surface image to the aligned z coordinate of the aligned pixel of the superimposed cutter head print image; and
  (e) selecting the z coordinate for the reference point that is the highest sum of z coordinates at each increment of movement, plus or minus any difference in the magnitude of the z coordinate for the reference point and z coordinate for the pixel of the cutter head print image where the sum is highest, the accumulation of such selected z coordinates determining the cutter path along the x-y plane that will not cause intersurface or intrasurface interference.

* * * * *